O. A. White.

Churn Dasher.

No. 90,413. Patented May 25, 1869.

Witnesses:
J. H. Burridge
Frank S. Alden.

Inventor,
O. A. White

United States Patent Office.

ORSAMUS A. WHITE OF NORWALK, OHIO

Letters Patent No. 90,413, dated May 25, 1869.

---

IMPROVEMENT IN CHURN-DASHERS.

---

The Schedule referred to in these Letters Patent and making part of the same.

---

*To all whom it may concern:*

Be it known that I, ORSAMUS A. WHITE, of Norwalk, in the county of Huron, and State of Ohio, have invented certain new and useful Improvements in Churn-Dashers; and I do hereby declare that the following is a full and complete description of the same, reference being had to the accompanying drawings, making a part of this specification, in which—

Figure 1:
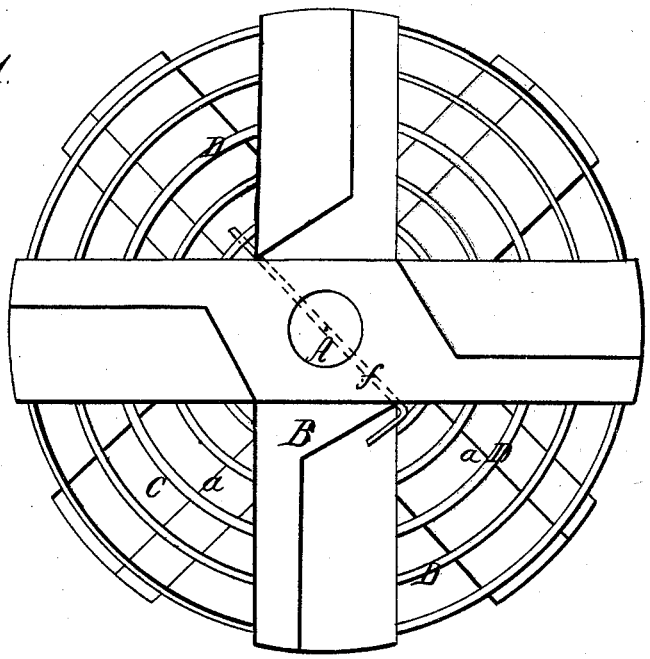

Figure 1 is a top view of the dasher.

Figure 2:
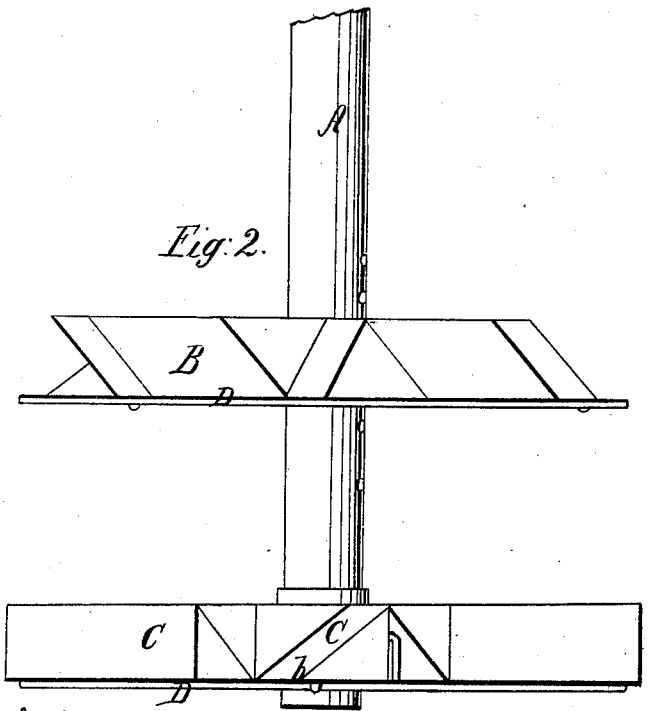

Figure 2, a side view.

Like letters of reference refer to like parts in the several views.

This invention relates to a churn-dasher, the peculiar construction of which is such that the cream is very thoroughly agitated thereby, so that the process of churning is done with great ease and facility.

In fig. 2, A represents a section of the handle, to the end of which are attached two pairs of radial arms, B C.

The lowermost pair is fixed to the handle in a rigid manner, whereas the upper pair is loosely attached thereto, so that it can be moved near to or distant from the lower pair, as and for a purpose hereinafter shown.

It will be observed that the sides of each arm are made biasing from the line $a$ downward from the top, and from the line or point $b$ from the bottom upward. The purpose of thus slanting the sides of the arms will presently be shown.

To each lower side of the arms is secured a series of concentric circles of wire, D, or the said wire may be of one entire piece, and coiled upon the arms, and thereto secured in the same manner as the circles.

I fit the upper pair of arms loosely to the handle, and secure it thereto by a pin, $f$. Now, when a large amount of cream is to be churned, the upper pair of arms is adjusted further from the lower pair than when a less quantity of cream is in the churn, so that, on operating the dasher, one pair of arms will agitate the upper portion of the cream, and the other that of the bottom. Hence, the entire mass of cream can be thoroughly agitated without lifting the dasher through it, nor, at the same time, lifting a large portion of the cream.

Should a small quantity of cream be in the churn, the upper set of arms can be taken off, and the lower arms only used, being thus a single dasher; or, when both pairs are used, the upper one can be removed, and thus make it more convenient for the purpose of cleaning.

Being aware that the separate parts of my dasher have before been used, I claim, only—

The combination, with the rigid radial arms C, constructed with slanting sides, and provided with a wire coil, or series of rings, of the adjustable radial arms B, formed also with slanting sides that incline in the direction opposite to that of the sides of the rigid arms, said adjustable arms being also provided with the wire coil, or series of rings specified.

Witnesses:  ORSAMUS A. WHITE.
J. H. BURRIDGE,
FRANK S. ALDEN.